(12) United States Patent
Ponsard et al.

(10) Patent No.: US 10,492,171 B2
(45) Date of Patent: Nov. 26, 2019

(54) METHOD FOR TRANSMITTING BROADCAST SIGNALS IN A WIRELESS COMMUNICATION SYSTEM

(71) Applicant: SIGFOX, Labege (FR)

(72) Inventors: Benoit Ponsard, Grenoble (FR); Raoul Mallart, Paris (FR); Lionel Zirphile, Ramonville Saint Agne (FR)

(73) Assignee: SIGFOX, Labege (FR)

( * ) Notice: Subject to any disclaimer, the term of this patent is extended or adjusted under 35 U.S.C. 154(b) by 115 days.

(21) Appl. No.: 15/565,304

(22) PCT Filed: Apr. 8, 2016

(86) PCT No.: PCT/FR2016/050821
§ 371 (c)(1),
(2) Date: Oct. 9, 2017

(87) PCT Pub. No.: WO2016/162649
PCT Pub. Date: Oct. 13, 2016

(65) Prior Publication Data
US 2018/0070333 A1 Mar. 8, 2018

(30) Foreign Application Priority Data
Apr. 10, 2015 (FR) ...................................... 15 53125

(51) Int. Cl.
*H04W 72/00* (2009.01)
*H04W 48/10* (2009.01)
(Continued)

(52) U.S. Cl.
CPC ............ *H04W 72/005* (2013.01); *H04B 7/12* (2013.01); *H04W 4/06* (2013.01); *H04W 48/10* (2013.01);
(Continued)

(58) Field of Classification Search
CPC ......... H04B 7/12; H04L 5/16; H04L 12/1886; H04W 4/06; H04W 48/10; H04W 72/005; H04W 72/04; H04W 88/02; H04W 88/12
See application file for complete search history.

(56) References Cited

U.S. PATENT DOCUMENTS

2008/0101334 A1* 5/2008 Bakker ................. H04J 3/0664
370/350
2010/0220671 A1 9/2010 Guillouard et al.
(Continued)

FOREIGN PATENT DOCUMENTS

EP 0 926 905 A1 6/1999
EP 0 977 376 A2 2/2000

*Primary Examiner* — Khoa Huynh
(74) *Attorney, Agent, or Firm* — Im IP Law; C. Andrew Im; Chai Im

(57) ABSTRACT

A method for transmitting broadcast signals from a group of base stations to terminals of a wireless communication system. Each base station having a coverage area. The coverage areas of the base stations of the group are distributed geographically such as to serve a geographical area. Since the broadcast signals are of limited duration and are transmitted in a frequency band used by all of the base stations of the group, the base stations of the group are time-synchronized in relation to one another. The broadcast signals from the base stations of the group are time-multiplexed. In addition, the wireless communication system has multiple geographical regions. Each region includes multiple groups of base stations), and the broadcast signals of different geographical regions are time-multiplexed.

12 Claims, 2 Drawing Sheets

(51) Int. Cl.
*H04B 7/12* (2006.01)
*H04W 4/06* (2009.01)
*H04W 72/04* (2009.01)
*H04W 88/02* (2009.01)
*H04W 88/12* (2009.01)

(52) U.S. Cl.
CPC ............ *H04W 72/04* (2013.01); *H04W 88/02* (2013.01); *H04W 88/12* (2013.01)

(56) References Cited

U.S. PATENT DOCUMENTS

2013/0128782 A1\* 5/2013 Boixadera ................. H04L 5/16
370/281
2015/0180676 A1\* 6/2015 Bao ..................... H04L 12/1886
370/230

\* cited by examiner

METHOD FOR TRANSMITTING BROADCAST SIGNALS IN A WIRELESS COMMUNICATION SYSTEM

RELATED APPLICATIONS

This application is a § 371 application from PCT/FR2016/050821 filed Apr. 8, 2016, which claims priority from French Patent Application No. 15 53125 filed Apr. 10, 2015, each of which is incorporated herein by reference in its entirety.

TECHNICAL FIELD

The present invention lies in the field of wireless communication systems and more particularly concerns a method for transmitting broadcast signals to terminals by a group of base stations of an access network and a method for receiving said broadcast signals.

BACKGROUND OF THE INVENTION

The present invention finds a particularly advantageous, although in no way limiting, application in ultra narrow band wireless communication systems. By ultra narrow band (UNB) is meant that the instantaneous frequency spectrum of the radio signals transmitted by the terminals to the access network has a frequency width less than one kilohertz.

UNB wireless communication systems of this kind are particularly suitable for M2M (machine-to-machine) and internet of things (IoT) type applications.

In a UNB wireless communication system of this kind the exchanges of data are essentially one-way on an uplink between terminals and an access network of said system.

The terminals transmit uplink messages that are collected by base stations of the access network with no need for association beforehand with one or more base stations of the access network. In other words, the uplink messages transmitted by a terminal are not addressed to a specific base station of the access network and the terminal transmits its uplink messages on the assumption that they will be received by at least one base station. Arrangements of this kind are advantageous in that the terminal does not need to carry out regular measurements, which are notably voracious in terms of electrical consumption, to determine the most appropriate base station to receive its uplink messages. The complexity lies on the access network, which must be able to receive uplink messages possibly transmitted at arbitrary times and on arbitrary center frequencies. Each base station of the access network receives uplink messages from the various terminals within range.

A mode of operation of this kind, in which the exchanges of data are essentially one-way, is entirely satisfactory for numerous applications, such as remote reading of gas, water and electricity meters, remote surveillance of buildings or houses, etc.

However, in some applications it can be advantageous also to be able to exchange data in the other direction, namely on a downlink from the access network to the terminals.

In particular it may be advantageous to transmit broadcast or multicast signals to the terminals. In particular, a plurality of frequency bands are possible for the transmission of the uplink messages, for example associated with respective different geographical regions that may have different regulatory constraints. The transmission of broadcast signals could then enable the terminals to identify the frequency band of the uplink in the geographical region in which they are located before transmitting uplink messages in a frequency band not intended for this purpose. For example, it would be possible to transmit the broadcast signals in the frequency band of the uplink or in a frequency band having a predefined frequency difference relative to the frequency band of the uplink.

Broadcast signals of this kind could equally be used to transmit any type of information that could be useful for all the terminals or for a large number of them.

However, to limit the production cost of the terminals the detection of the broadcast signals must be carried out in a simple manner that is economical from the electrical consumption point of view.

Moreover, the broadcast signals must be transmitted with limited impact on the collection of the uplink messages. In particular, to reduce the deployment cost of the access network, the use of half duplex base stations may be envisaged, i.e. base stations that can receive uplink messages and transmit broadcast signals, but not both at the same time. In this case, a base station that is transmitting a broadcast signal is not available to receive uplink messages transmitted by the terminals and so uplink messages may be missed.

SUMMARY OF THE INVENTION

An object of the present invention is to remedy some or all of the limitations of the prior art solutions, in particular those described above.

To this end, and in accordance with a first aspect, the invention concerns a method for transmission of broadcast signals by a group of base stations to terminals of a wireless communication system, each base station having a coverage area, the coverage areas of said base stations of the group being geographically distributed so as to service a geographical area. Moreover, the broadcast signals being of limited duration and transmitted in the same frequency band used by all the base stations of the group, the base stations of the group are temporally synchronized with one another and the broadcast signals from different base stations of the group are time-division multiplexed.

Thus, a group of base stations servicing a geographical area utilizes the same frequency band to transmit the broadcast signals. Consequently, once the frequency band is known by a terminal, it suffices for it always to listen to the same frequency band while it is in the same geographical zone, so that listening for the downlink, which does not necessitate listening successively to a plurality of different frequency bands, is particularly simple and economical from the electrical consumption point of view.

Moreover, the base stations of the group are temporally synchronized and the broadcast signals that they transmit are time-division multiplexed, i.e. said broadcast signals from the base stations of the group are transmitted in respective different time slots. Consequently, a terminal does not have to manage the simultaneous arrival of a plurality of broadcast signals, which facilitates the processing necessary for detecting and decoding each broadcast signal.

Moreover, at any given time there is at most only one base station of the group transmitting a broadcast signal. Consequently, if the group includes $N_G$ base stations and the latter are moreover half duplex stations then there are always at least $(N_G-1)$ base stations that may be available for the reception of uplink messages. The impact on the collection of the uplink messages is therefore limited if the base stations are half duplex stations and can be further reduced if the coverage areas of the adjacent base stations of the group have a geographical overlap.

In particular embodiments, the transmission method may further include one or more of the following features, separately or in all technically possible combinations.

In particular embodiments, the base stations of the group belong to respective different sets, each set including a plurality of base stations belonging to the respective different groups servicing respective different geographical zones and the base stations of the same set transmit the broadcast signals simultaneously.

In particular embodiments, the broadcast signals from the base stations of each group are transmitted according to a predefined time-division multiplexing pattern repeated recurrently so that said time-division multiplexing pattern is repeated simultaneously in the geographical zones serviced by the various groups of base stations.

In particular embodiments, the base stations are geographically distributed so that the adjacent base stations of different groups belong to different sets.

In particular embodiments, the base stations of different sets are organized in each group according to the same geographical distribution pattern.

In particular embodiments, the transmission times of the broadcast signals are predefined universal time coordinate (UTC) times.

In particular embodiments, the broadcast signals transmitted by the group of base stations have a frequency overlap.

In particular embodiments, the coverage areas of adjacent base stations of the group have a geographical overlap.

In particular embodiments, the wireless communication system including a plurality of geographical regions each including a plurality of groups of base stations, the broadcast signals from different geographical regions are time-division multiplexed.

In particular embodiments, the broadcast signals from different geographical regions are grouped temporally.

In particular embodiments, the broadcast signals from the base stations of the group are transmitted according to a predefined time-division multiplexing pattern repeated according to a predefined repetition pattern and the broadcast signals from the base stations include identifiers enabling said broadcast signals within the time-division multiplexing pattern to be distinguished.

Arrangements of this kind are advantageous in that, when it has detected a broadcast signal, each terminal can then estimate a theoretical start time of a subsequent time-division multiplexing pattern. For example, if a terminal is moving in the geographical zone, it can determine from what time it has to listen to the downlink to be in a position to receive the first broadcast signal of the time-division multiplexing pattern, transmitted by one of the base stations of the group. This is equally valid, if the terminal moves from one geographical zone to another, when the base stations are organized into sets and the base stations of the same set transmit their broadcast signals simultaneously.

In particular embodiments, the broadcast signals further include information enabling the time-division multiplexing patterns in the repetition pattern to be distinguished.

In particular embodiments, the duration of the time-division multiplexing pattern is at least ten times less than the minimum time between two repetitions of the time-division multiplexing pattern.

According to a second aspect, the present invention concerns an access network to a wireless communication system including base stations including means configured to transmit broadcast signals to terminals in accordance with a transmission method conforming to any of the embodiments of the invention.

In preferred embodiments, some or all of the base stations of the access network are of half duplex type.

According to a third aspect, the present invention concerns a method of reception by a terminal of broadcast signals transmitted in accordance with a transmission method conforming to any of the embodiments of the invention. Said receiving method more particularly includes the initial temporal synchronization of the terminal with an access network of the wireless communication system, the estimation of a theoretical start time of a subsequent time-division multiplexing pattern, and searching for broadcast signals as a function of said theoretical start time. If a broadcast signal is detected, said receiving method includes:
- measurement of a time of reception of said detected broadcast signal,
- extraction of the identifier of said detected broadcast signal,
- temporal resynchronization of the terminal with the access network as a function of the extracted identifier, the time-division multiplexing pattern, the measured reception time and the theoretical start time of the detected time-division multiplexing pattern.

According to a fourth aspect, the present invention concerns a terminal including means configured to implement a method of receiving broadcast signals conforming to any of the embodiments of the invention.

DESCRIPTION OF THE FIGURES

The invention will be better understood on reading the following description, given by way of nonlimiting example and with reference to the Figures, which show.

In these figures, references identical from one figure to another designate identical or analogous elements. For reasons of clarity, the elements represented are not to scale, unless otherwise indicated.

DETAILED DESCRIPTION OF EMBODIMENTS

Figure 1:
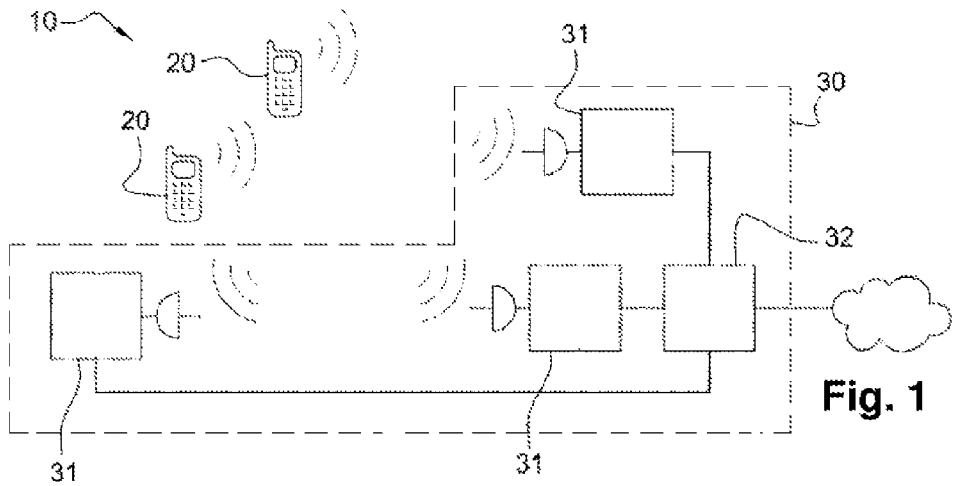
FIG. 1: a diagrammatic representation of a wireless communication system.

FIG. 1 represents diagrammatically a wireless communication system 10, for example of UNB type, including a plurality of terminals 20 and an access network 30 including a plurality of base stations 31.

The terminals 20 and the base stations 31 of the access network 30 exchange data in the form of radio signals. By "radio signal" is meant an electromagnetic wave propagating via wireless means at frequencies in the traditional spectrum of radio waves (from a few hertz to several hundred gigahertz).

The terminals 20 are adapted to transmit uplink messages to the access network 30 on an uplink.

Each base station 31 is adapted to receive the uplink messages from the terminals 20 that are in range. Each uplink message received in this way is for example transmitted to a server 32 of the access network 30, possibly accompanied by other information such as an identifier of the base station 31 that has received it, the measured power of said received uplink message, the time of reception and/or the measured center frequency of said received uplink message, etc. The server 32 for example processes all the uplink messages received from the various base stations 31.

Moreover, the access network 30 is also adapted to transmit via the base stations 31 broadcast signals on a downlink to the terminals 20, which are adapted to receive them. The broadcast signals can be multicast signals.

A base station 31 conventionally has a coverage area such that, for the terminals 20 in said coverage area, the uplink messages transmitted by those terminals 20 can be detected by said base station 31 and the broadcast signals transmitted by said base station 31 can be received by those terminals. It should be noted that the coverage area of a base station 31 is not necessarily the same for the uplink and for the downlink. The remainder of the description refers in a nonlimiting manner to the situation in which the uplink coverage area and the downlink coverage area are identical.

The base stations 31 of the access network 30 are conventionally geographically distributed so as to be able to service a large number of terminals 20.

Figure 2:
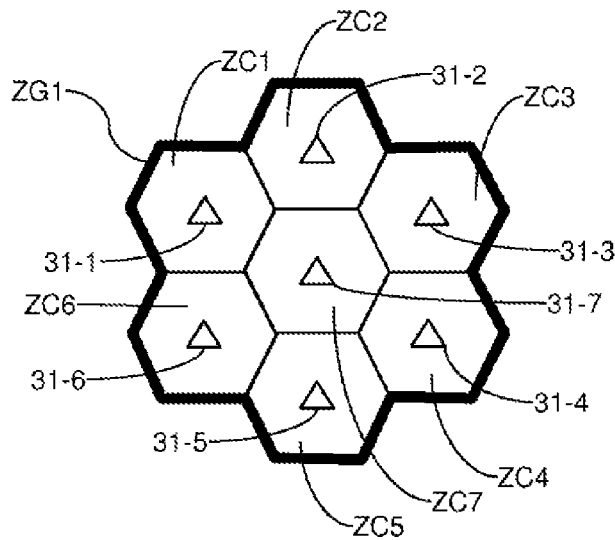
FIG. 2: an example of the geographical distribution of base stations in a geographical zone.

FIG. 2 represents diagrammatically a group of $N_G$ base stations 31 located in different geographical sites and the coverage areas of which together service a geographical zone ZG1. In the nonlimiting example illustrated by FIG. 2, the number $N_G$ of base stations 31 of the group is equal to 7 and said $N_G$ sub stations 31 of the group are respectively designated 31-1 to 31-7 when they have to be distinguished and their coverage zones are respectively designated ZC1 to ZC7.

In the example illustrated by FIG. 2 the coverage zones ZC1 to ZC7 are represented diagrammatically as having no geographical overlap between them. However, the coverage zones of adjacent base stations of the group preferably have a geographical overlap between them. A terminal 20 in a geographical overlap zone is therefore able to receive broadcast signals transmitted by different base stations 31, which in theory makes it possible to reduce the listening time necessary to detect at least one broadcast signal. Moreover, uplink messages transmitted by a terminal 20 can be received by a plurality of base stations 31, which is advantageous in particular in the case of half duplex base stations, which are not available for reception when they are transmitting a broadcast signal on the downlink, but also to improve the link budget by employing greater spatial diversity. The geographical overlap between coverage zones of adjacent base stations 31 is preferably such that, at each location within the geographical zone ZG1, an uplink message transmitted by a terminal 20 can be received by at least two base stations 31 and/or said terminal 20 is able to receive broadcast signals transmitted by at least two base stations 31.

The present invention notably concerns a method 50 of transmission of broadcast signals by a group of base stations 31, as illustrated by FIG. 2, and a method 60 of reception of those broadcast signals by the terminals 20, which methods are described in detail hereinafter.

A) Broadcast Signal Transmission Method

The broadcast signal transmission method 50 is implemented by the access network 30 of the UNB wireless communication system 10.

The remainder of the description refers to the situation in which said broadcast signal transmission method 50 is implemented primarily by the base stations 31 of said access network 30. To this end the base stations 31 include for example respective processing modules (not shown in the Figures), each processing module including for example one or more processors and storage means (magnetic hard disk, solid-state memory, optical disk, etc.) in which a computer program product is stored in the form of a set of program code instructions to be executed to execute the various steps of the broadcast signal transmission method 50. Alternatively, each processing module includes one or more programmable logical circuits, of FPGA, PLD, etc. type, and/or application-specific integrated circuits (ASIC) adapted to implement some or all of said steps of the broadcast signal transmission method 50.

Each base station 31 further includes wireless communication means, considered to be known to the person skilled in the art, enabling said base station to receive uplink messages and to transmit broadcast messages in the form of radio signals.

In other words, the base stations 31 of the access network 30 include respective means configured in software (dedicated computer program product) and/or hardware (FPGA, PLD, ASIC, etc.) to implement the various steps of the broadcast signal transmission method 50.

The broadcast signals transmitted by the base stations 31 are of limited duration, for example between a few hundred milliseconds and a few seconds inclusive. Moreover, according to the invention, the base stations 31 of the group transmit the broadcast signals in the same frequency band, which is therefore shared by said base stations of the group.

The remainder of the description refers in a nonlimiting manner to a frequency band 200 kilohertz wide. The frequency band in which the base stations 31 of the group transmit the broadcast signals can be identical to the frequency band of the uplink in which the terminals 20 transmit the uplink messages or a frequency band having a predefined frequency difference relative to said frequency band of the uplink, etc.

It should be noted that if the uplink messages transmitted by the terminals 20 are ultra narrow band messages in a UNB wireless communication system, for their part the broadcast signals are not necessarily ultra narrow band signals and can have an instantaneous spectrum width greater than one kilohertz. The remainder of the description refers to the nonlimiting situation in which the broadcast signals are also ultra narrow band signals, which corresponds to a preferred embodiment of the invention.

Figure 3:
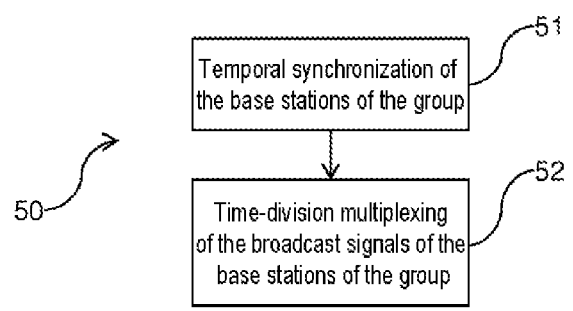
FIG. 3: a diagram showing the principal steps of a method of transmission of broadcast signals by a group of base stations.

FIG. 3 represents diagrammatically the principal steps of a broadcast signal transmission method 50, which are:
- 51 temporal synchronization of the base stations 31-1 to 31-7 of the group,
- 52 transmission of the broadcast signals by the various base stations 31-1 to 31-7 of the group, the broadcast signals transmitted by different base stations being time-division multiplexed.

Accordingly, and according to the invention, the broadcast signals from the various base stations 31-1 to 31-7 of the group that are transmitted in the same frequency band are also time-division multiplexed.

To this end the base stations 31-1 to 31-7 of the group are temporally synchronized beforehand to be sure that said broadcast signals can be transmitted successively with no temporal overlap between them. Any method of temporal synchronization of the base stations 31-1 to 31-7 of the group with one another can be employed and the choice of one particular method merely constitutes one variant of the invention. Moreover, it should be noted that the accuracy of the temporal synchronization between the base stations 31 can be relatively low. For example, an accuracy of the order of one second is considered sufficient in the context of the invention, for example by providing guard time slots between the transmissions of successive broadcast signals to prevent them from overlapping in time.

Given that the broadcast signals are time-division multiplexed, they are preferably transmitted close to one another in the frequency domain in order to limit the width of the frequency band listened to by each terminal 20, which can possibly, where necessary, be less than 200 kilohertz. For example, the broadcast signals transmitted by the group of base stations 31-1 to 31-7 can have a frequency overlap. The frequency overlap can be only partial. However, the broadcast signals are preferably transmitted at the same center frequency so that the frequency overlap is complete, i.e. so that they are substantially superposed in the frequency domain. Accordingly, if it knows the center frequency on which said broadcast signals are transmitted, each terminal 20 can then listen to the downlink in a narrow listening frequency band, of the order of the instantaneous spectral width of the broadcast signals.

Figure 4:
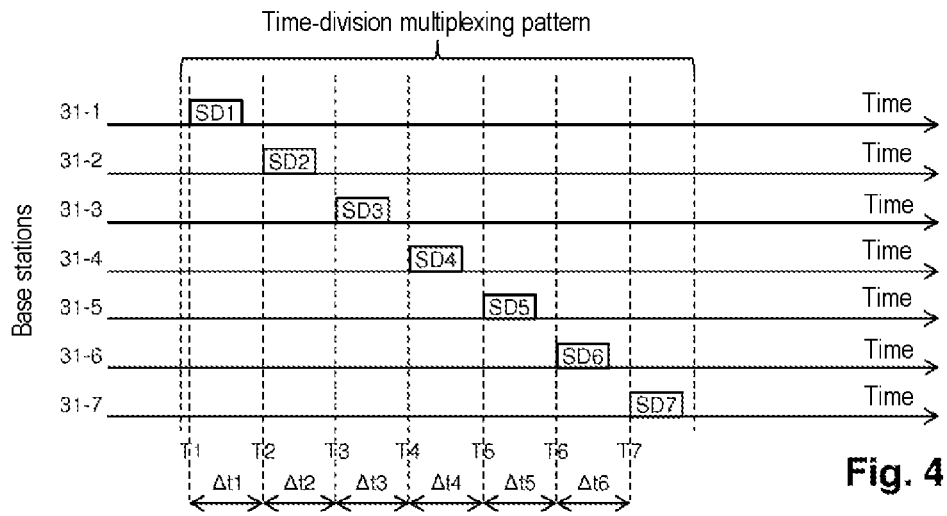
FIG. 4: timing diagrams illustrating a preferred embodiment in which the broadcast signals from the base stations of a group are transmitted in accordance with a predefined time-division multiplexing pattern.

FIG. 4 represents diagrammatically timing diagrams illustrating one nonlimiting example in which the broadcast signals from the base stations 31-1 to 31-7 of the group are transmitted in accordance with a predefined time-division multiplexing pattern.

By "predefined time-division multiplexing pattern" is meant that said broadcast signals from said base stations 31-1 to 31-7 of the group are transmitted in a predefined order and at respective transmission times having predefined temporal offsets between them, to within the accuracy of the temporal synchronization process. If broadcast signals are considered having a duration of the order of one second, then the time differences can for example be of the order of a few seconds to a few tens of seconds.

For example, and as shown in FIG. 4, the base stations 31-1 to 31-7 successively transmit broadcast signals SD1 to SD7 at respective transmissions times T1 to T7:

the transmission time T2 has a time difference Δt1, greater than the duration of the broadcast signal SD1 relative to T1, the transmission time T3 has a time difference Δt2, greater than the duration of the broadcast signal SD2 relative to T2, the transmission time T4 has a time difference Δt3, greater than the duration of the broadcast signal SD3 relative to T3, the transmission time T5 has a time difference Δt4, greater than the duration of the broadcast signal SD4 relative to T4, the transmission time T6 has a time difference Δt5, greater than the duration of the broadcast signal SD5 relative to T5, the transmission time T7 has a time difference Δt6, greater than the duration of the broadcast signal SD6 relative to T6.

The time-division multiplexing pattern is for example repeated recurrently. It should be noted that the content of the broadcast signals SD1 to SD7 can vary from one time-division multiplexing pattern to another, although in contrast the order of transmission of the broadcast signals by the base stations 31-1 to 31-7 and the time differences between the transmission times of said broadcast signals are the same from one time-division multiplexing pattern to another.

In preferred embodiments of the invention the time-division multiplexing pattern including the broadcast signals SD1 to SD7 is repeated in accordance with a predefined repetition pattern.

For example, the time-division multiplexing pattern can be repeated periodically with a predefined repetition period ΔT.

According to another example, the repetition pattern of the time-division multiplexing pattern can consist in repeating said time-division multiplexing pattern at predefined universal time coordinate (UTC) times. For example, the repetition pattern of the time-division multiplexing pattern can consist in repeating said time-division multiplexing pattern, during one day, at 04:00 UTC, 10:00 UTC, 16:00 UTC and 22:00 UTC. The repetition pattern can itself be repeated every day.

The duration of the time-division multiplexing pattern is preferably at least ten times less than the minimum time between two repetitions of said time-division multiplexing pattern, or even at least one hundred times less. The transmissions of the broadcast signals SD1 to SD7 are therefore grouped in time. Consequently, if a terminal 20 knows approximately when at least one broadcast signal is likely to be received, then said thermal 20 can easily, by listening to the frequency band of the downlink over a time that can be relatively short (of the order of the duration of a few broadcast signals), detect all the broadcast signals transmitted by the base stations 31 in the coverage zones of which said terminal 20 is located. Between two time-division multiplexing patterns, i.e. most of the time, the terminal 20 can therefore go to standby mode on the downlink.

In preferred embodiments the broadcast signals SD1 to SD7 include identifiers enabling said broadcast signals within the time-division multiplexing pattern to be distinguished. A terminal 20 that detects a broadcast signal can therefore, thanks to the identifier, determine the rank of said detected broadcast signal in the time-division multiplexing pattern. The broadcast signals SD1 to SD7 can also include information enabling the time-division multiplexing patterns within the repetition pattern to be distinguished, in particular when the latter are not repeated periodically.

In the example illustrated by FIG. 3, the base stations 31-1 to 31-7 are geographically distributed so as to service the geographical zone ZG1. In order to service a large geographical region, it is possible to provide a plurality of groups of $N_G$ base stations 31 that service respective different geographical zones that are distributed within the geographical region concerned.

Where appropriate, the base stations 31 of the various groups are, in preferred embodiments, organized into $N_G$ respective different sets of base stations 31. The $N_G$ base stations 31 of each group therefore belong to respective different sets, designated BS1 to BS7 if $N_G$ is taken as equal to 7.

The base stations 31 of the same set are preferably temporally synchronized with one another and transmit their broadcast signals simultaneously, preferably in the same frequency band. Consequently, the base stations 31 of the set BS1 transmit their broadcast signals simultaneously, the base stations 31 of the set BS2 transmit their broadcast signals simultaneously, the base stations 31 of the set BS3 transmit their broadcast signals simultaneously, etc. If a time-division multiplexing pattern of the broadcast signals in considered, then said time-division multiplexing pattern is repeated simultaneously in all the geographical zones. The advantages described above at the level at the geographical zone are then extended to a plurality of geographical zones.

Figure 5:
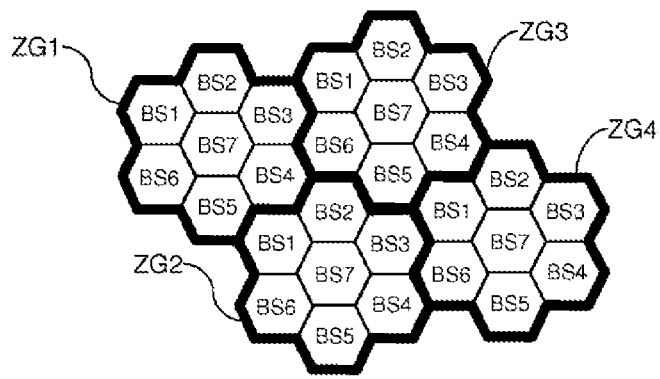
FIG. 5: an example of the geographical distribution of groups of base stations in a geographical region.

FIG. 5 represents diagrammatically an example of the geographical distribution of different groups of base stations 31 servicing respective different geographical zones ZG1 to ZG4. In the example illustrated by FIG. 5 the geographical zones ZG1 to ZG4 are represented diagrammatically as having no geographical overlap between them. However, there is nothing to rule out having adjacent geographical zones with a geographical overlap between them. Moreover, in this example, the base stations 31 of different sets are organized in each group according to the same geographical distribution pattern which notably makes it possible to be sure that adjacent base stations in the geographical region but belonging to different groups necessarily belong to different sets and therefore do not transmit their broadcast signals simultaneously.

Accordingly, the base stations 31 in the same geographical region preferably transmit all the broadcast signals in the same frequency band and said broadcast signals within each geographical zone are moreover time-division multiplexed. The broadcast signals of the various groups of base stations 31 are advantageously transmitted in the same time slot. On the other hand, from one geographical region to another, it is possible to use a different frequency band for the transmission of the broadcast signals, for example because the regulatory constraints are not the same. Where appropriate, the broadcast signals of different geographical regions are preferably time-division multiplexed. In other words, the broadcast signals of each geographical region are transmitted in the same time slot and different time slots are used, without overlaps between them, for the different geographical regions. Thus, on the one hand it is not necessary for a terminal 20 to have to listen simultaneously to a plurality of different frequency bands. On the other and, the listening time can possibly be reduced. In fact, if a terminal 20 changes geographical region it will generally listen to the downlink over the time slot associated with the geographical region in which it was previously located and will not detect any broadcast signal. However, neither will the terminal 20 miss the broadcast signals transmitted in the geographical region in which it is located, since they are transmitted in a different time slot. Accordingly, the terminal 20 listening in the wrong time slot, associated with the geographical region in which it was previously located, does not delay the detection of the broadcast signals transmitted in the geographical region in which it is located. Moreover, if the terminal 20 knows the temporal distribution of the respective time slots of the various geographical regions and the frequency bands associated with them the terminal 20 can listen during subsequent time slots to the frequency bands respectively associated with said time slots and detect the broadcast signals more quickly.

Moreover, the broadcast signal transmission time slots of the various geographical regions are preferably grouped temporally in order to limit the time for a terminal 20 to listen on the downlink for a plurality of geographical regions.

B) Broadcast Signal Receiving Method

Figure 6:
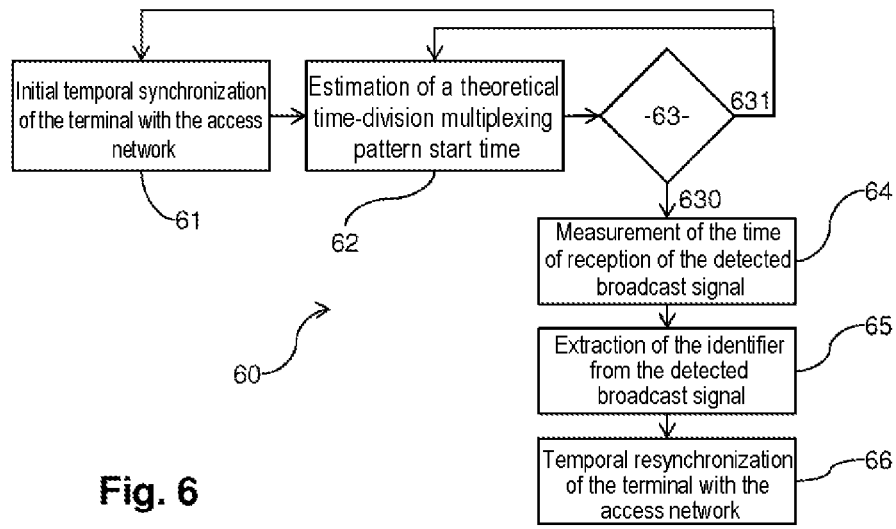
FIG. 6: a diagram illustrating the principal steps of a method of reception of broadcast signals by a terminal.

FIG. 6 represents diagrammatically the principal steps of a method 60 of reception by a terminal 20 of broadcast signals transmitted by the access network 30 in accordance with what has been described above.

For example, each terminal 20 includes a processing module (not shown in the Figures) including one or more processors and storage means (magnetic hard disk, solid-state memory, optical disk, etc.) in which a computer program product is stored in the form of a set of program code instructions to be executed to implement the various steps of the broadcast signal receiving method 60. Alternatively, the processing module includes one or more programmable logic circuits, of FPGA, PLD, etc. type, and/or application-specific integrated circuits (ASIC) adapted to implement some or all of said steps of the broadcast signal receiving method 60. Each terminal 20 further includes wireless communication means, considered known to the person skilled in the art, enabling said terminal to send uplink messages and to receive downlink messages in the form of radio signals.

In other words, each terminal 20 includes a set of means configured in software (dedicated computer program product) and/or hardware (FPGA, PLD, ASIC, etc.) for implementing the various steps of the broadcast signal receiving method 60.

As illustrated by FIG. 6, the method 60 of reception of broadcast signals by a terminal 20 includes first of all a step 61 of initial temporal synchronization of said terminal 20 with the access network 30.

As for the base stations 31, the accuracy of the temporal synchronization between the terminal 20 and the access network 30 can be relatively low. For example, an accuracy of the order of one second is considered sufficient in the context of the invention.

The initial temporal synchronization of the terminal 20 with the access network 30 can employ any method known to the person skilled in the art and a particular method constitutes only one variant of the invention. For example, the terminal 20 can initially be synchronized by prolonged listening on the downlink until at least one broadcast signal is detected. If the broadcast signals are moreover transmitted in accordance with a predefined time-division multiplexing pattern, then the terminal 20 can extract the identifier from the detected broadcast signal and deduce from it the rank of said detected broadcast signal within said time-division multiplexing pattern. The terminal 20 can then estimate a theoretical start time of a subsequent time-division multiplexing pattern, for example as a function of an a priori knowledge of the repetition pattern and, where appropriate, information extracted from the detected broadcast signal enabling the time-division multiplexing patterns within said repetition pattern to be distinguished.

According to another example, the terminal 20 can initially be synchronized by transmitting a request to the access network 30. The access network 30 then responds by transmitting a downlink message to said terminal 20 that includes information enabling the latter to be synchronized temporally with the access network 30. For example, this synchronization information consists in the UTC time (if the times of transmission of the broadcast signals are UTC times) or the waiting time for the start of the next time-division multiplexing pattern, etc.

The broadcast signal receiving method 60 then includes, if it is necessary to receive a broadcast signal, a step 62 of estimating a theoretical start time of a subsequent time-division multiplexing pattern and a step 63 of searching for broadcast signals as a function of said theoretical start time. The terminal 20 is preferably by default in standby mode on the downlink and is awoken shortly before said theoretical start time of the time-division multiplexing pattern to listen to the downlink starting from said theoretical start time.

When a broadcast signal is detected (reference 630 in FIG. 6), the receiving method 60 includes steps of:
- 64 measuring the time of reception of the detected broadcast signal, which corresponds for example to the UTC time of reception of said broadcast signal,
- 65 extraction of the identifier from said detected broadcast signal,
- 66 temporal resynchronization of the terminal 20 with the access network 30 as a function of the extracted identifier, the time-division multiplexing pattern, the measured reception time and the theoretical start time of the detected time-division multiplexing pattern.

For example, from the extracted identifier and the theoretical start time of the time-division multiplexing pattern, the terminal 20 can determine the theoretical time of reception of the detected broadcast signal. The time difference between the measured reception time and the theoretical time of reception of said detected signal enables the terminal 20 to resynchronize its internal clock to that of the access network 30.

If no broadcast signal is detected (reference 631 in FIG. 6) during the search step 63, after listening on the downlink for the duration of a time-division multiplexing pattern, the receiving method 60 then continues for example by returning to the step 62 of estimating a theoretical start time of a subsequent time-division multiplexing pattern or the step 61 of initial temporal synchronization.

More generally, it should be noted that the embodiments and applications considered above have been described by way of nonlimiting example and that other variants can therefore be envisaged.

In particular, the invention has been described considering a UNB wireless communication system. According to other examples there is nothing to exclude considering other types of wireless communication system, including ones for which the instantaneous frequency spectrum of the radio signals transmitted by the terminals is greater than one kilohertz wide.

The invention claimed is:

1. A method for transmitting broadcast signals by a group of base stations to terminals of a wireless communication system, each base station having a coverage zone, the coverage zones of said base stations of the group being geographically distributed so as to service a geographical zone, comprising steps of:
   transmitting the broadcast signals in a same frequency band used by all the base stations of the group, the broadcast signals being of limited duration;
   temporally synchronizing the base stations of the group with one another;
   time-division multiplexing the broadcast signals of different base stations of the group;
   wherein the wireless communication system comprises a plurality of geographical regions, each geographical region comprises a plurality of groups of base stations;
   time-division multiplexing the broadcast signals of different geographical regions; and
   wherein the time-division multiplexed broadcast signals are transmitted successively with no temporal overlap therebetween.

2. The method as claimed in claim 1, further comprising step of organizing the plurality of groups of base stations of a geographical region into a plurality of respective different sets of base stations, the base stations of each group belonging to respective different sets, each set comprising a plurality of base stations belonging to respective different groups servicing respective different geographical zones; and wherein the base stations of the same set transmit the broadcast signals simultaneously.

3. The method as claimed in claim 2, further comprising a step of geographically distributing the base stations so that adjacent base stations of different groups belong to different sets.

4. The method as claimed in claim 1, wherein broadcast signal transmission times are predefined universal time coordinate times.

5. The method as claimed in claim 1, wherein the broadcast signals transmitted by a group of base stations have a frequency overlap.

6. The method as claimed in claim 1, wherein the coverage zones of adjacent base stations of a group have a geographical overlap.

7. The method as claimed in claim 1, further comprising a step of temporally grouping the broadcast signals of different geographical regions.

8. The method as claimed in claim 1, further comprising step of transmitting the broadcast signals of the base stations of a group in accordance with a predefined time-division multiplexing pattern repeated in accordance with a predefined repetition pattern; and wherein the broadcast signals of the base stations comprise identifiers enabling the broadcast signals within the time-division multiplexing pattern to be distinguished.

9. The method as claimed in claim 8, wherein the broadcast signals further comprise information enabling the time-division multiplexing patterns to be distinguished within the repetition pattern.

10. The method as claimed in claim 8, wherein a duration of the time-division multiplexing pattern is at least ten times less than a minimum duration between two repetitions of the time-division multiplexing pattern.

11. An access network of a wireless communication system, the access network comprising base stations, each base station comprising a transmitter configured to transmit broadcast signals to terminals of the wireless communication system, each base station having a coverage zone, the coverage zones of the base stations within a group being geographically distributed so as to service a geographical zone, wherein:
   within the group, each base station is configured to transmit the broadcast signals in a same frequency band used by all the base stations of the group, the broadcast signals being of limited duration;
   within the group, all the base stations are temporally synchronized with one another;
   the broadcast signals of different base stations within the group are time-division multiplexed;
   the access network comprises different geographical regions, each geographical region comprising a plurality of groups of base stations, and the broadcast signals of different geographical regions are time-division multiplexed; and
   wherein time-division multiplexed broadcast signals are transmitted successively with no temporal overlap between said broadcast signals.

12. The access network as claimed in claim 11, wherein some or all of the base stations are of half duplex type.

* * * * *